United States Patent
Brearley

[11] Patent Number: 5,496,098
[45] Date of Patent: Mar. 5, 1996

[54] BRAKING IN ELECTRONIC BRAKING SYSTEMS

[75] Inventor: Malcolm Brearley, Solihull, Great Britain

[73] Assignee: Lucas Industries Public Limited Company, Solihull, England

[21] Appl. No.: 313,065
[22] PCT Filed: Mar. 23, 1993
[86] PCT No.: PCT/GB93/00594
  § 371 Date: Sep. 26, 1994
  § 102(e) Date: Sep. 26, 1994
[87] PCT Pub. No.: WO93/18949
  PCT Pub. Date: Sep. 30, 1993

[30] Foreign Application Priority Data

Mar. 24, 1992 [GB] United Kingdom ............... 9206344

[51] Int. Cl.⁶ .................. B60T 13/58; B60T 8/18
[52] U.S. Cl. ........................... 303/22.2; 303/9
[58] Field of Search ............... 303/9, 15–17, 303/20, 22.1, 3, 7

[56] References Cited

U.S. PATENT DOCUMENTS

| | | |
|---|---|---|
| 4,712,839 | 12/1987 | Brearley et al. . |
| 4,920,493 | 4/1990 | Brearley et al. . |
| 5,002,343 | 3/1991 | Brearley et al. ............... 303/7 |
| 5,004,299 | 4/1991 | Brearley et al. ............... 303/15 |
| 5,004,300 | 4/1991 | Brearley et al. ............... 303/15 |
| 5,016,249 | 5/1991 | Hurst et al. . |
| 5,050,938 | 9/1991 | Brearley et al. ............... 303/7 |
| 5,080,445 | 1/1992 | Brearley et al. ............... 303/7 |
| 5,088,042 | 2/1992 | Brearley et al. . |

FOREIGN PATENT DOCUMENTS 2080458 2/1982 United Kingdom .

Primary Examiner—Josie Ballato
Attorney, Agent, or Firm—Oblon, Spivak, McClelland, Maier & Neustadt

[57] ABSTRACT

An electronic braking system for a vehicle having foundation brakes (137, 138) and a vehicle retarder (129), wherein an electrical braking demand signal (D) is generated from a single brake pedal and wherein the retarder (129) is operated variably or in small steps as the brake pedal movement is increased from a zero or rest position up to a partial point in its movement range which is calculated to give substantially maximum retarder powder based on the total mass of the vehicle. As a result, for a fully loaded condition this partial point occurs at low pedal deflection and, in an unloaded condition where a given retarder will produce a higher deceleration, this point occurs at a higher pedal deflection, wherein in both cases pushing the pedal beyond the calculated partial point causes foundation braking to be commenced to supplement the retarder torque.

7 Claims, 9 Drawing Sheets

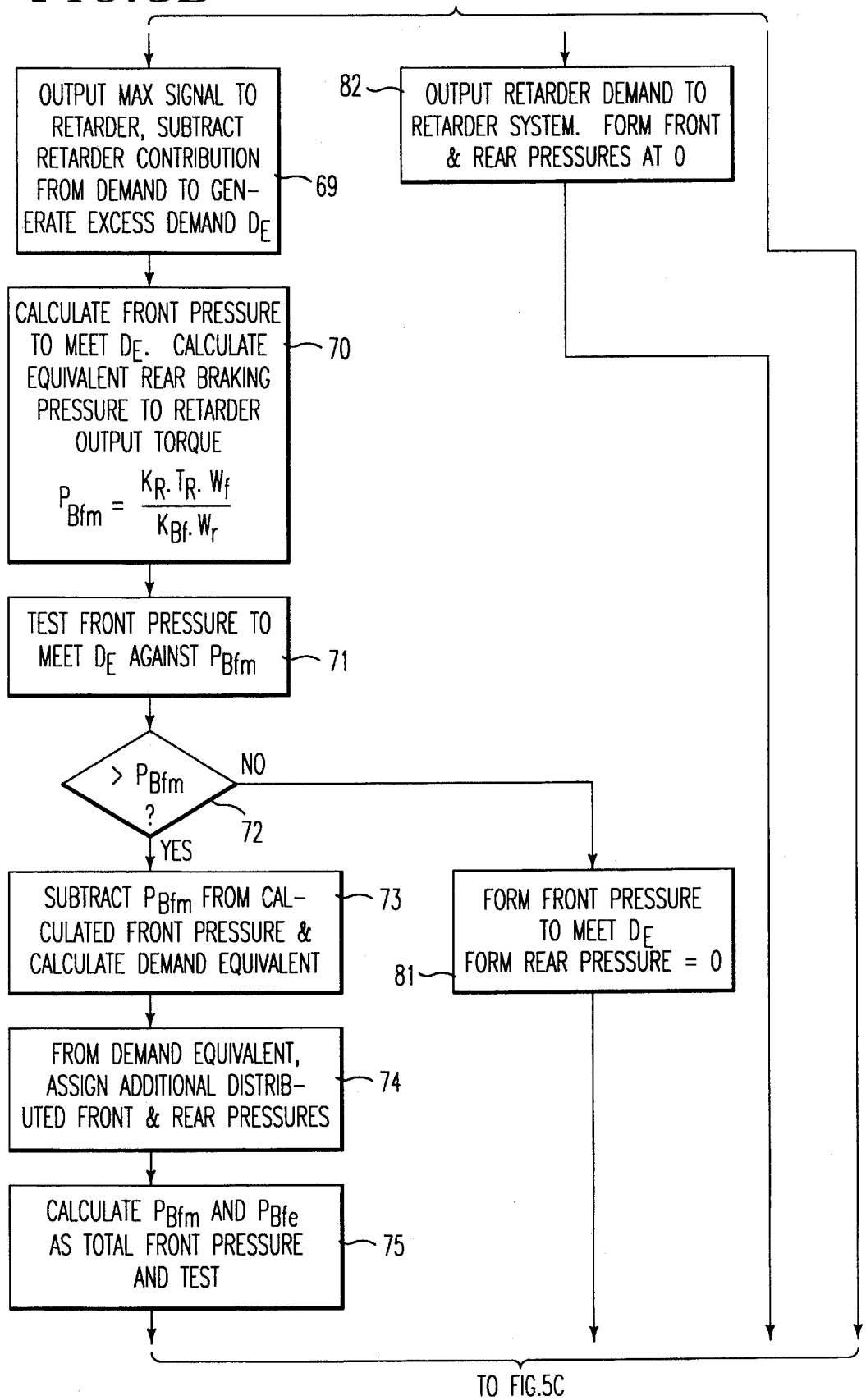

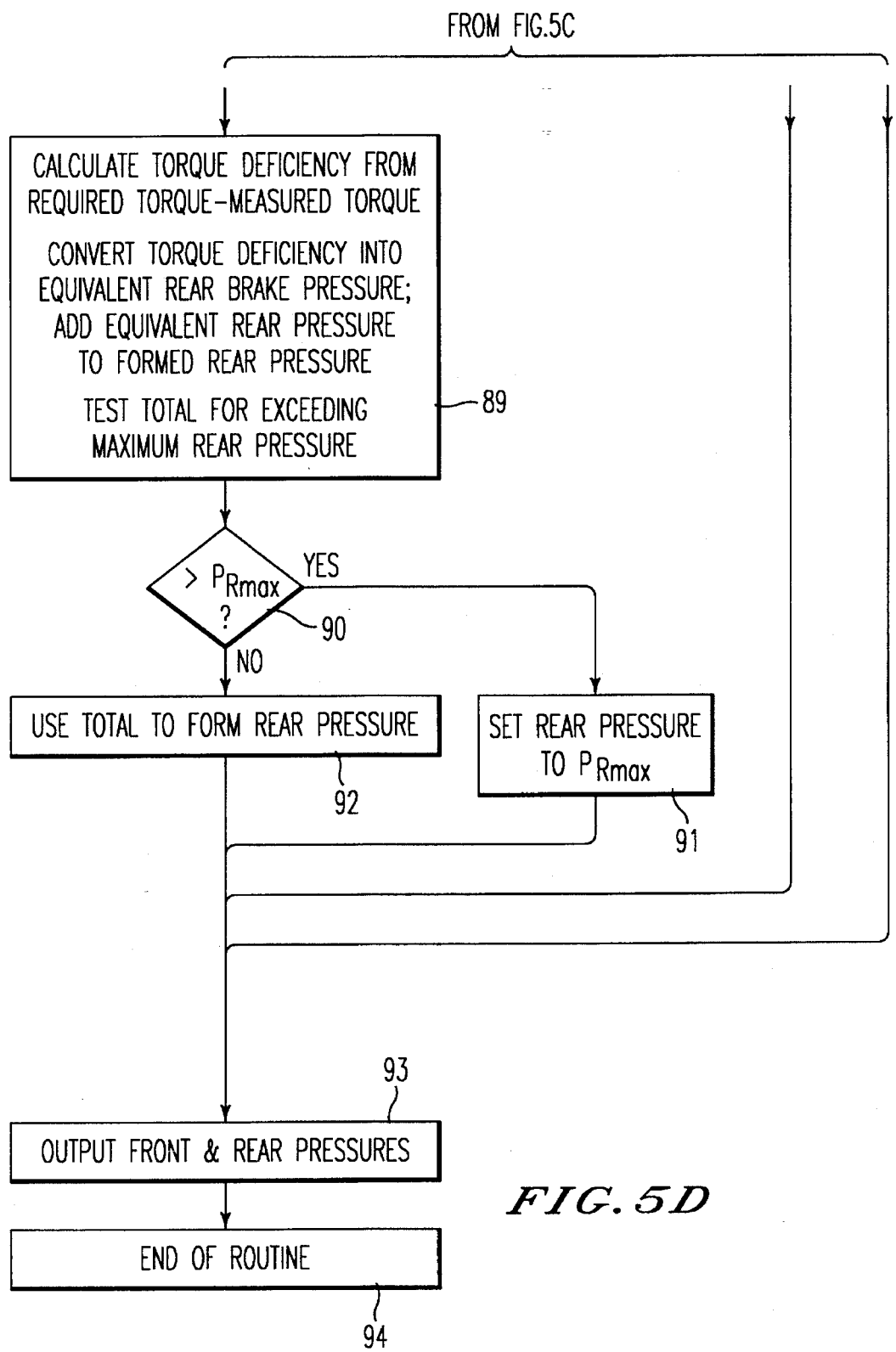

BRAKING IN ELECTRONIC BRAKING SYSTEMS

TECHNICAL FIELD

The present invention is concerned with increasing the efficiency of braking in vehicles fitted, in addition to wheel-mounted foundation brakes, with a transmission shaft or engine retarder and also fitted with an Electronic Braking System, sometimes known as a Brake-by-Wire System.

BACKGROUND ART

Generally, vehicles are equipped with retarders in order to have the benefit of a form of dynamic supplemental braking means which has great endurance despite being of limited capacity and having an effectiveness which falls at low speeds. The use of such retarders saves foundation (friction) brake lining wear, particularly at low braking demands. The conventional practice is for retarders to be under separate control from the foundation brakes, usually from a driver-operated hand control.

It is known from GB-A-2 080 458 to provide an electronic braking system in which control of the foundation brakes and transmission shaft or engine retarder is coordinated in response to the braking demand signal. In the system of GB-A-2 080 458, the retarder receives the full brake demand signal and is operated in an open loop, whereas the foundation friction brakes are operated in a closed loop and receive the deceleration error signal. A problem in practice with such a system, wherein the retarder receives full braking demand and a closed loop acceleration system is employed, is that, because of system delays and inherent lack of responsiveness in air brake actuation, system instability can be caused, particularly if wear, corrosion and poor maintenance cause hysteresis levels to increase. A further problem with the system of GB-A-2 080 458 arises from closing the loop using deceleration signals which are inherently noisy, being derived by a differentiation process on signals which are subject to substantial load noise disturbances. This is because the filtering required to remove much of the noise generated, results in a slow deceleration signal not adequate for dealing with fast changes in braking demand which is required of road vehicles under critical circumstances.

DISCLOSURE OF THE INVENTION

It is an object of the present invention to provide a control system whereby the foundation brakes and transmission shaft or engine retarder can be operated in an improved coordinated manner using an electrical braking demand signal generated by a single brake foot pedal.

In accordance with the present invention, there is provided an Electronic Braking System for a vehicle having foundation brakes and a vehicle retarder, wherein an electrical braking demand signal is generated from a single brake pedal and wherein the retarder is operated variably or in small steps as the brake pedal movement is increased from zero, or rest, up to a partial point in its movement range which is calculated to give substantially the maximum retarder power based on the total mass of the vehicle such that for a full load condition this partial point occurs at low pedal deflection and, in an unladen condition where a given retarder will produce a higher deceleration, this point occurs at a higher pedal deflection, and in both cases pushing the pedal beyond the calculated partial point causes foundation braking to be commenced to supplement the retarder torque.

Preferably, foundation braking is introduced at the front axle only and is increased with increasing pedal travel up to a point where the front axle braking effort is equal to the retarder braking effort at the rear axle, with correction being made for the axle weight ratio so that the adhesion utilization is equal between axles.

The retarder torque preferably alone provides for low level braking and is supplemented by single axle foundation braking to an increasing level as speed falls when retarder output falls, in order to maintain vehicle deceleration from a constant brake pedal input.

Advantageously, the retarder controller increases retarder drive to maintain a constant developed retarder torque until the retarder reaches maximum drive so that a further decrease in retarder effectiveness is accompanied by an increasing application of the foundation brakes to maintain the effective braking forces down to a virtual standstill.

At the first detection of a skid condition at an axle, preferably the drive axle, the retarder will be switched off and an equivalent level of braking applied to all vehicle axles as a friction braking substitute without any change in brake pedal position whereas, if foundation braking was taking place when skidding was detected, the substitute component is added to existing braking pressures.

In one embodiment, where the retarder-equipped vehicle tows a trailer, at all braking demand levels in excess of the check braking region, trailer braking is instituted whenever the retarder is substantially deployed.

In the case of an unladen truck towing a laden trailer, this condition can be recognized by the system controller which is adapted to disable the retarder-only condition in favor of braking at all axles and at the trailer in unison, although the drive axle braking effort may still be provided by the retarder.

BRIEF DESCRIPTION OF THE DRAWINGS

The invention is described further hereinafter, by way of example only, with reference to the accompanying drawings, in which:

FIGS. 5a, 5b, 5c, 5d and 5e constitute a flow chart illustrating one possible operating mode of system in accordance with the present invention.

BEST MODE FOR CARRYING OUT THE INVENTION

It is an expectation of a Brake-by-Wire System that the brake pedal position has a preset relationship with vehicle deceleration despite all the changes in the conditions of speed, load and gradient at the vehicle, during normal operation. This should be maintained where both brake systems are signalled from the single brake pedal. Because an aim of integrated braking must also be to use the retarder whenever possible in order to save lining wear, both targets are achieved only if the pedal movement is initially assigned to the retarder as a braking source. The range of "retarder only" braking, in terms of pedal travel, is variable because retarder power is limited and the vehicle deceleration it can produce depends on vehicle conditions of load and gradient and on vehicle speed. Thus, for a laden vehicle, the pedal range will be small and the electrical signal from the pedal will also be small and therefore must be amplified so as to generate higher retarder drive signals, while in the unladen case the pedal movement will be greater in the retarder range since the retarder can produce a larger vehicle deceleration. Thus, the pedal signal is larger so that not so much amplification will be required. The required amplification is obtained by multiplying the pedal demand signals by the total axle weight in order to derive the required retarder demand. The limit in retarder output torque reduces the maximum retardation which it can produce in the laden case requiring the introduction of foundation braking at an earlier point on the brake pedal travel.

Figure 2C:
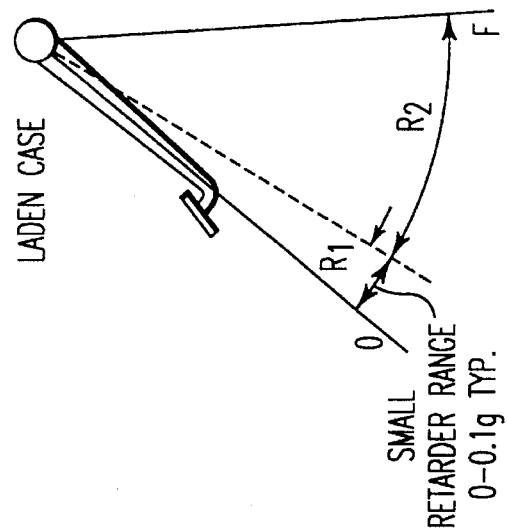
FIGS. 2a–2c show the pedal and the demand signals which it produces for the retarder and the foundation brakes.
Figure 2B:
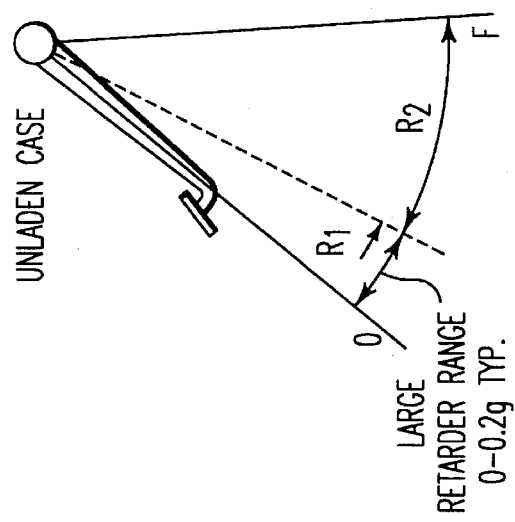
Figure 2A:
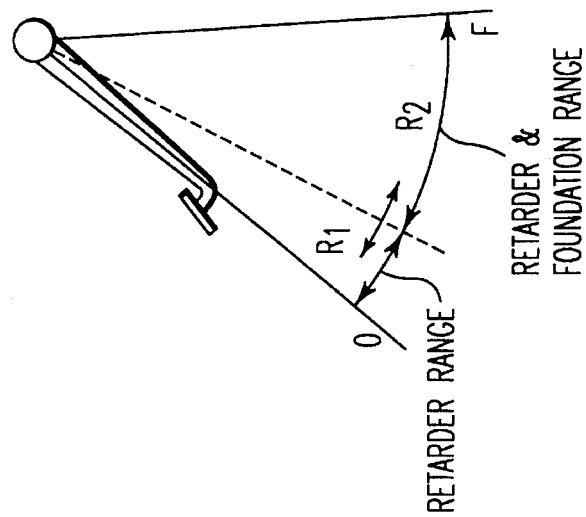

FIGS. 2a–2c shows the range of retarder control in the laden and unladen cases which is calculated from the maximum retardation level which the retarder will produce as follows:

$$\text{Retardation 'g' max} = \frac{KR \times \text{Torque Rating}}{\text{veh mass}}$$

$$\max = \text{'g'} \frac{\max}{kp} = \frac{KR \times \text{Torque Rating}}{kp \times \text{veh mass}}$$

Figure 3:
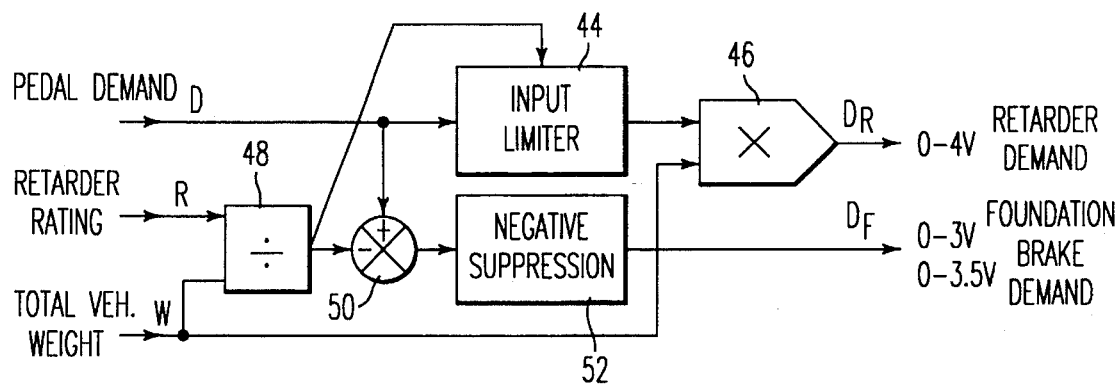
FIG. 3 is an equivalent input circuit of the pedal-produced braking demand signal.
Figure 4:
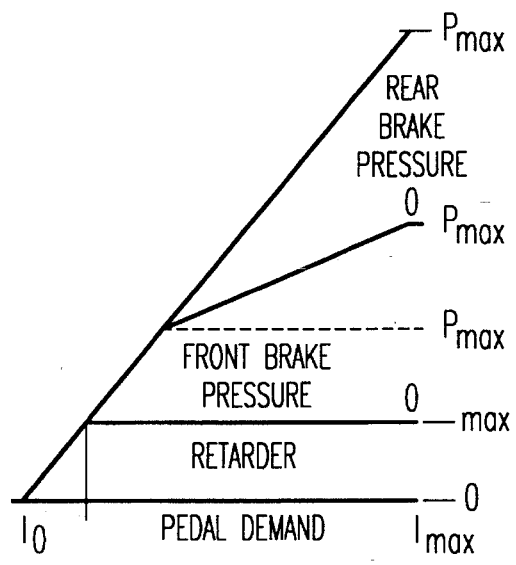
FIG. 4 illustrates the braking distribution between the front and rear brakes with increased braking demand.

FIG. 3 shows a means for using the pedal signal which is produced in the retarder travel range, to generate an input signal for the retarder sub-system. The pedal signal D is multiplied by the total weight W derived from the sum of axle load signals and this is then scaled to produce the retarder drive signal which causes generation of a proportional torque in the drive axle transmission shaft.

The process causes the retarder torque to build up to a maximum for a short pedal travel in the laden case and for a somewhat longer travel in the unladen case and retains the pedal travel vehicle deceleration relationship. In an ideal retarder sub-system, the local retarder control circuit is organized to produce a torque output which is proportional to the drive signal demand from the EBS controller and, should the torque output fall because of falling speed or rising temperature, this local control increases the retarder drive to maintain torque. Clearly at some point, the retarder reaches maximum output and further drive is either impossible or ineffective and a signal is returned to the EBS controller to indicate that maximum torque capability has been reached. This is an important signal because it indicates that any further braking demand must be met from the foundation brakes. Also it indicates further fall in speed will cause the retarder torque to be insufficient to maintain the established deceleration unless foundation braking is introduced.

In the condition of increasing demand where foundation braking must be introduced, the integrated control system applies this braking to the front axle initially in order to distribute braking more correctly, given the current axle loading conditions and the maximum retarder torque going to the drive axle. Braking at the front axle is increased up to a level which is calculated to be equal to the rear axle braking effort as generated by the retarder, allowing for axle load differences. This is calculated from the retarder torque figures by establishing an equivalent foundation braking pressure at the rear axle brakes which would produce the same braking effort, i.e. Retarder Torque TR generates braking force KRTR at the rear axle, and Real axle brakes produce braking force FRB=KBr.PBr i.e. proportionally applied equivalent braking pressure PBre is given by:

$$PBre = \frac{KRTR}{KBr}$$

$$\text{Max brake pressure at front axle alone } PBfm = \frac{KRTR \cdot WF}{KBf \cdot Wr}$$

(this is equivalent rear brake pressure adjusted for relative axle loads and front brake fractor)

Where

KBf=front axle brake constant

KBr=rear axle brake constant

Wf=front axle load

Wr=rear axle load

The increasing brake demand causes foundation braking to be applied to the front axle only up to the calculated level of PBf max and thereafter a further increase in demand causes an increase of pressure at all wheels. Thus, at some point approaching maximum demand, the front axle will be at maximum pressure so that increasing demand causes a further increase of pressure only at the rear axle, even though this must increase the risk of rear axle skidding.

At partial foundation braking levels, speed reduction or temperature increase causes the retarder output torque to fall, even though the drive is maintained at the maximum. The rear foundation brake pressure is at this point being reduced by PBre as an allowance offset for the retarder torque. This retarder torque reduction is accompanied by a corresponding fall in the offset allowance, i.e. an increase in foundation braking at the rear axle which compensates for the falling retarder torque at low speeds. This principle is extended so as to be employed where braking at lower demands cause retarder-only braking. The retarder drive is increased at lower speeds as the efficiency falls in order to try and maintain retarder torque. However, once maximum drive is being employed, a further speed decrease would cause a reduction in vehicle deceleration, but this is countered by supplementing a decreasing retarder output with an increasing application of foundation braking at one axle. This is achieved as follows—whenever the retarder is operating and generating torque, an equivalent pressure is calculated at which the rear (preferably but not necessarily) friction brakes would give the same braking effort. The pressure shortfall as the retarder efficiency falls off is registered and this pressure is applied to the rear axle brakes and is increased as the speed falls further in order to maintain vehicle deceleration substantially constant without any action being taken by the driver. This take-over by the foundation brakes, of the low speed retarder function, is continued down to standstill but is removed upon release of the brake pedal.

The EBS controller continuously monitors wheel speeds and upon detection of skidding removes the signal which causes the retarder drive and substitutes foundation braking at all wheels in place of the lost braking effort. This is achieved by removing the pedal offset which creates the movement range normally used to provide the retarder input thereby boosting the demand for foundation braking on both axles. Of course, during this changeover, the foundation brakes may be interrupted by overriding antilocking action in order that the tendency to skid can be reversed. Relocation of braking to all wheels may prevent further skidding due to the much better distribution of braking but if the adhesion level is very low, repeated skid cycling will occur and will keep further retarder operation inhibited, thereby making skidding much easier to control because foundation braking is considerably more responsive than most known forms of retarder.

Most EBS systems are employed on large trucks which may be installed with retarders but also are quite likely to tow trailers of either the drawbar of semi-trailer categories. Current heavy vehicles of this type have separate control of the retarder, usually from a driver-operated hand lever. In an EBS vehicle with integrated braking control from a single foot brake pedal as described hereinbefore, braking demands in the towing vehicle are offset to create a retarder-only signalling area of pedal travel. Trailer braking demands are also signalled from the same pedal-generated signals but the offset used with the trailer brake demand is much reduced compared with the towing vehicle demands so that at all braking levels above the check braking region, typically 0.07 to 0.1g, trailer braking automatically accompanies the use of the retarder on the towing vehicle. This distributes towing vehicle and trailer braking in order to increase the safety in braking the combination by reducing or removing the trailer thrust caused by unbraked trailer conditions.

There are some combination conditions which can be dangerous and which result from poor load distribution, such as an unladen truck towing a laden drawbar trailer or a semi-trailer where all the trailer load is at the rear of the trailer bed. In these cases the EBS system is adapted to recognize that the trailer mass is much higher than the drive axle loading and automatically to disable the retarder so that the pedal offset is removed altogether and alternative braking is made using the towing vehicle and trailer foundation brakes in unison. Trailer mass is measured from tension measurements made in the coupling during the vehicle acceleration process where acceleration is measured from an on-board accelerometer carried on the towing vehicle and tension is measured by sensors incorporated in the coupling and sensitive to pull or thrust.

Referring again to FIG. 1, this shows an EBS schematic where braking is commanded from an electrical signal D known as the demand, generated by a new form of brake pedal unit 10. This signal is processed by an electronic controller 12 (divided into front and rear sections 12a,12b) which then meets the braking demand D by establishing pneumatic pressures at brake actuators 18 at each axle via special electro-pneumatic converter valves 16. The axle pressures are not generally equal because they are set by the controller 12 to be proportional to axle loads as measured by front and rear load sensors 20,22 and are scaled to take into account brake conversion factors which relate brake pressure to braking effort for each axle. The vehicle is equipped with a retarder 24 and retarder controller 26 which are to be operated in an integrated manner with the foundation brakes, the retarder being driven from the controller 12 which generates a retarder demand signal $D_R$ with a preset scaling factor. The retarder output torque $R_T$ from the retarder controller 26 is monitored by either a sensing means or by known calibration based on the drive signal and transmission shaft speed (related to rear axle speed). This torque signal $R_T$ is able to be translated into a rear axle braking force because of the known drive axle ratio and rear wheel size. There is further provided in the retarder control circuit 26 a signal $R_M$ which indicates that the retarder is developing its maximum torque and cannot respond to any increase to drive. This signal is returned to the EBS controller 12 where it indicates that the retarder 24 must be supplemented by axle braking via the foundation brakes.

Figure 1:
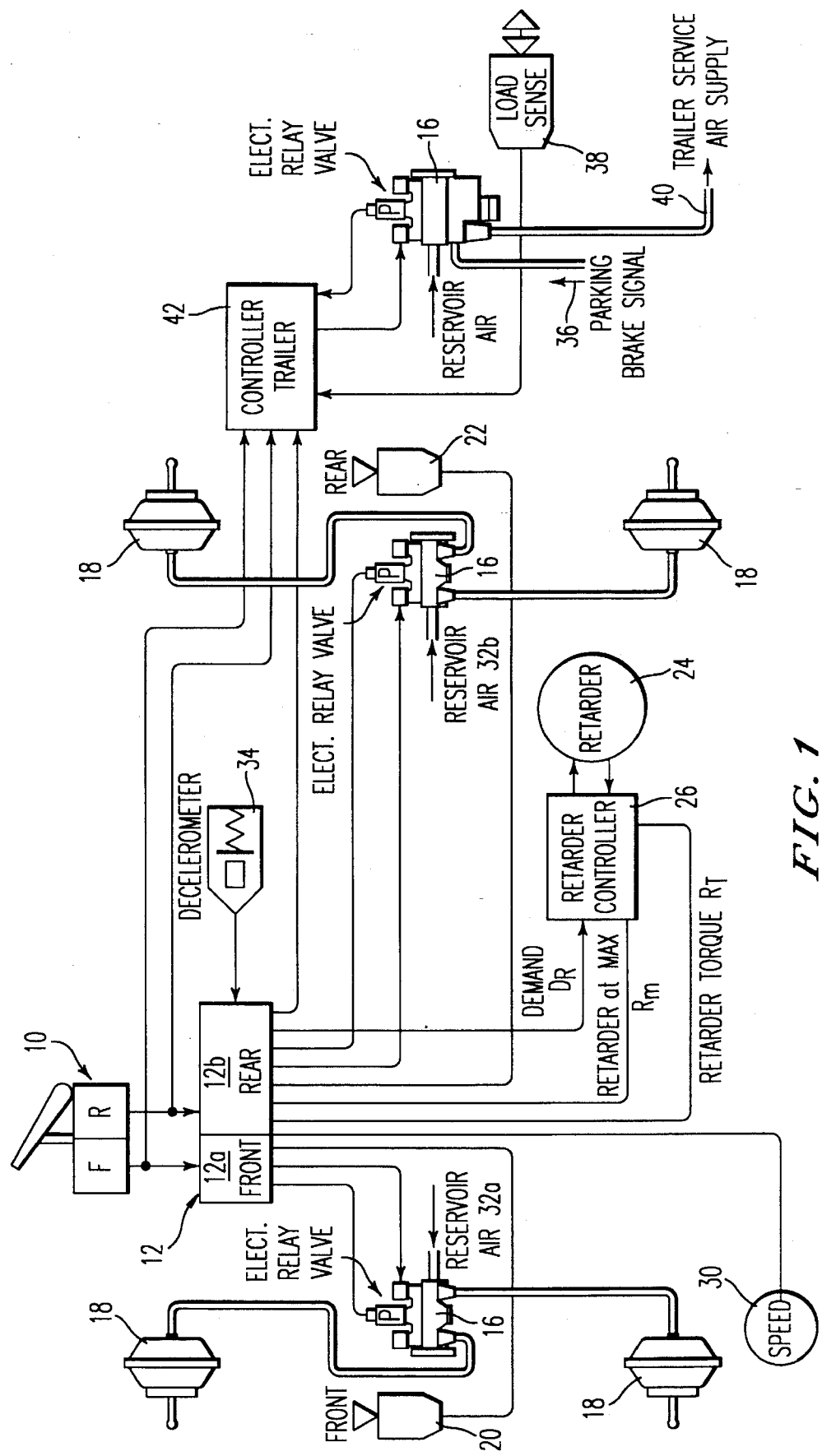
FIG. 1 is a diagrammatic illustration of a typical electronically controlled braking system (EBS) to which the present invention has been applied.

Also shown in FIG. 1 are: a vehicle speed sensor 30; reservoir air inputs 32a, 32b; a vehicle decelerometer 34; a parking brake signal 36; a load sensing means 38; a trailer service air supply 40; and a trailer controller 42.

FIG. 2 shows the pedal and the demand signals which it produces for the retarder and the foundation brakes. The retarder range is indicated by $R_1$ and the retarder plus foundation range by $R_2$. FIG. 2b is the unladen case where the retarder range is wider since the deceleration capability is higher. FIG. 2c is the laden case where a smaller signal range has to produce a full drive to the retarder. This range for the retarder is allocated by measuring the total weight of the vehicle and setting the span on the basis of the deceleration which a nominal retarder will produce on the actual vehicle in its current state of load. With figures identified in FIG. 2, the full range= 0.8 g–4 V i.e. 5.0 Vlg.

Figure 6:
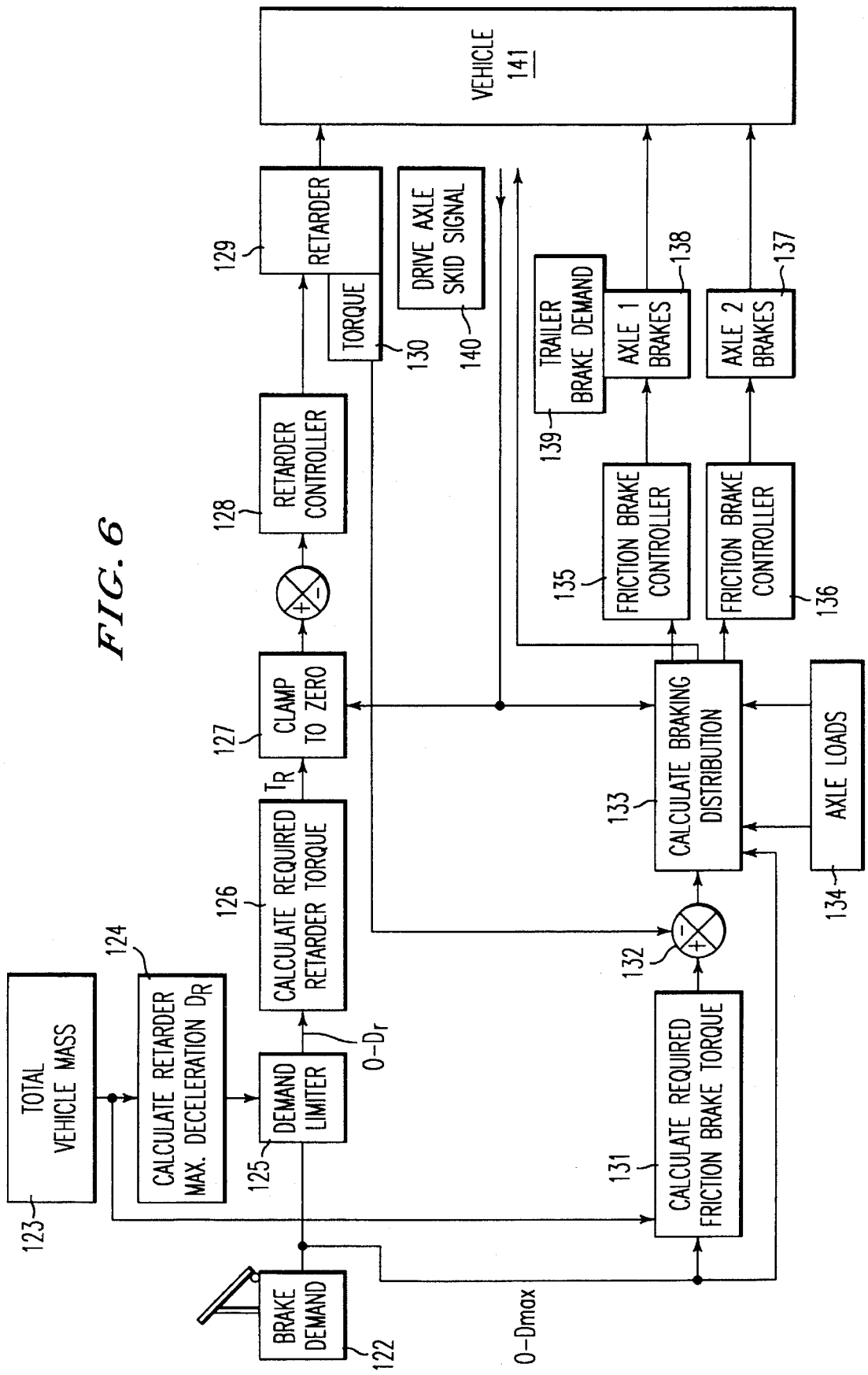
FIG. 6 is a schematic diagram illustrating the operation of a system in accordance with the present invention.

Retarder range = 0.5 v laden–0.3 to 5 v Foundation
1.0 v unladen–0.3 v Foundation FIG. 6 is a schematic drawing illustrating the basic operation of a system in accordance with the present invention. The various boxes in FIG. 6 are identified as follows: brake demand 122; total vehicle mass 123; calculate retarder max deceleration $D_R$, 124; demand limiter 125; calculate required retarder torque 126; clamp to zero 127; retarder controller 128; retarder 129; torque 130; calculate required friction brake torque 131; and/subtract 132; calculate braking distribution 133; axle loads 134; friction brake controller 135; friction brake controller 136; axle 2 brakes 137; axle 1 brakes 138; trailer brake demand 139; drive axle skid signal 140; vehicle 141. This system uses closed loop control of the retarder torque and because the total vehicle mass is assessed, the required torque is calculated from the braking demand and a limit is set from the retarder torque braking above which friction braking will be added as a supplement. Operating the retarder in closed loop can be slow if the retarder is slow so that there is no stability problem and no disturbance to retarder torque measurements. Transient lags in retarder torque may be noticeable but torque errors resulting cause substitution by friction braking to maintain a fast braking response, overall.

FIG. 3 is an equivalent input circuit of the pedal-produced braking demand signal D which shows how the retarder maximum rating is registered to set max retarder demand and as an offset to produce the follow-on foundation braking demand signal which will go initially to the front axle and at increasing demands requiring more than twice the retarder capability, to both axles.

The retarder capability is entered into the system as max torque is limited, and this is divided by total vehicle mass to give the max deceleration which the retarder can produce. This figure is used in two ways: to restrict the retarder input component of demand to this level and to offset foundation braking demands by subtracting this level from actual demands and suppressing any negative figures.

Referring in detail to FIG. 3, pedal demand D is input to an input limiter 44 whose output forms one input of a multiplier 46. The retarder rating signal R and total vehicle weight W are inputs to a divider 48 whose output is fed to a negative input of an adder/subtractor 50, the output of which passes via a negative suppression means 52 to form the foundation brake demand $D_F$. The output of the multiplier 42 forms the retarder demand $D_R$. With reference to FIG. 3, $$\text{foundation brake demand} = \text{pedal demand} - \text{Retarder performance}$$

$$= \text{pedal demand} - \frac{\text{Retarder Torque}}{\text{Total weight}} \quad \text{max}$$

Figure 5A:
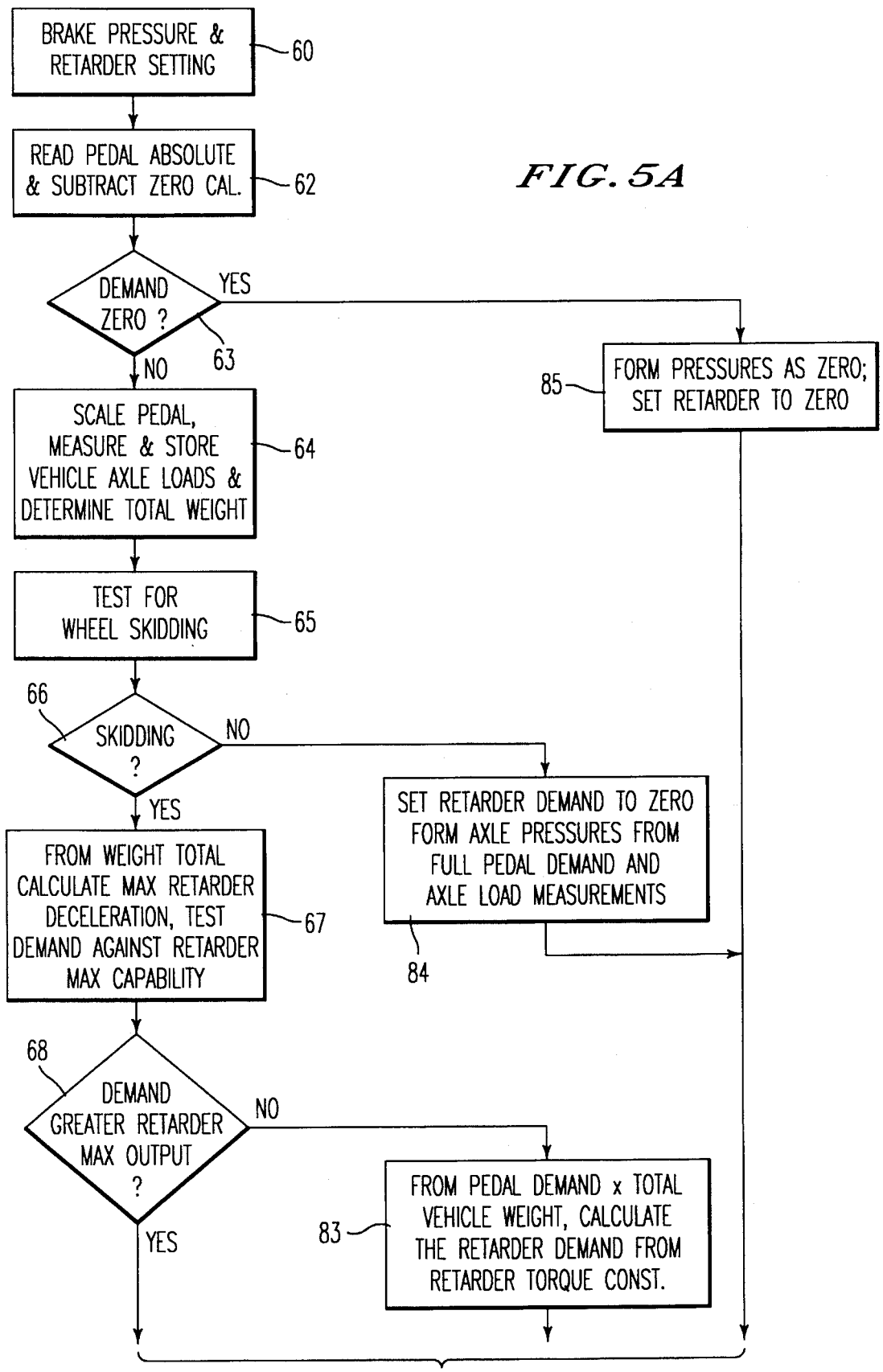
Figure 5C:
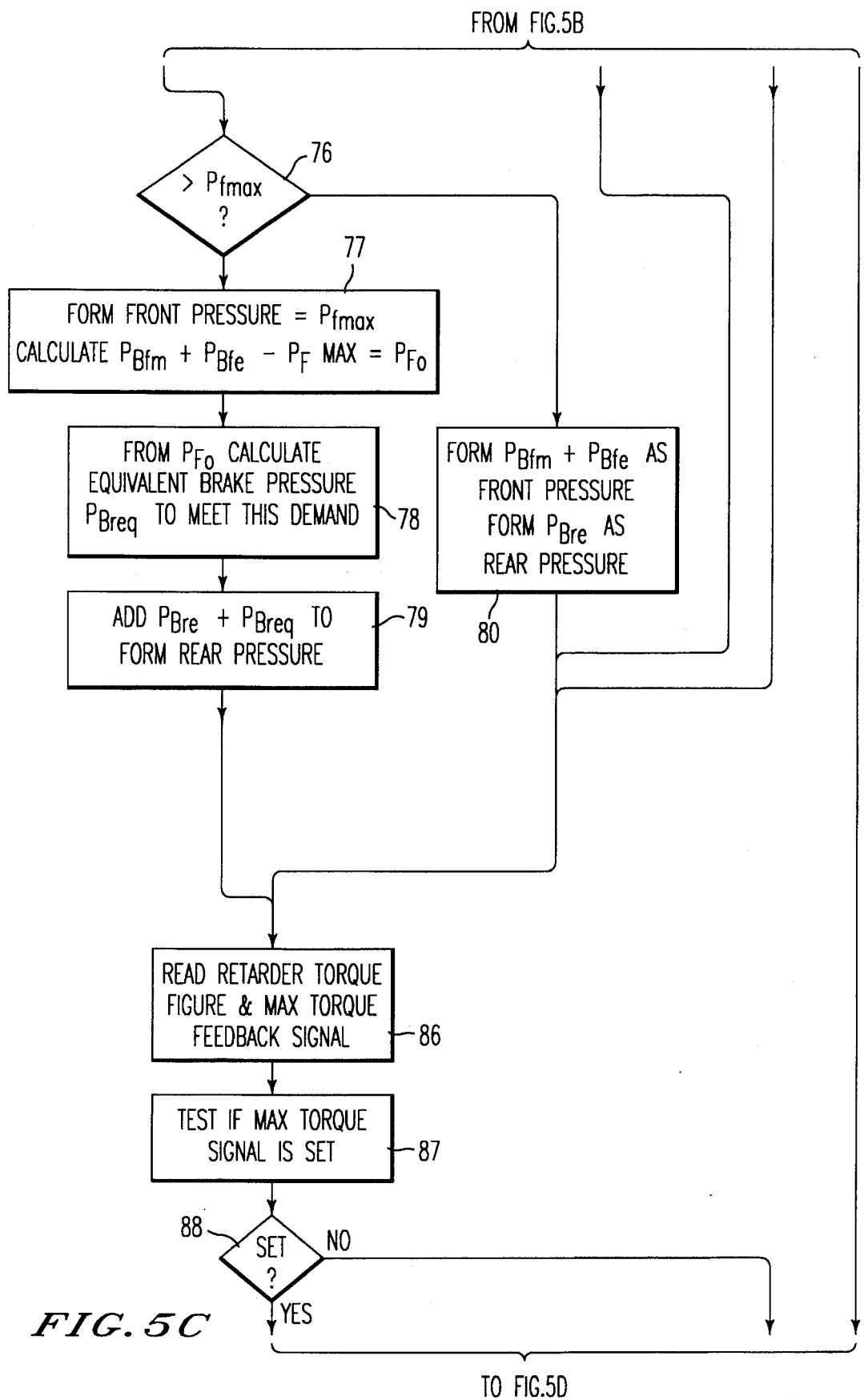
Figure 5E:
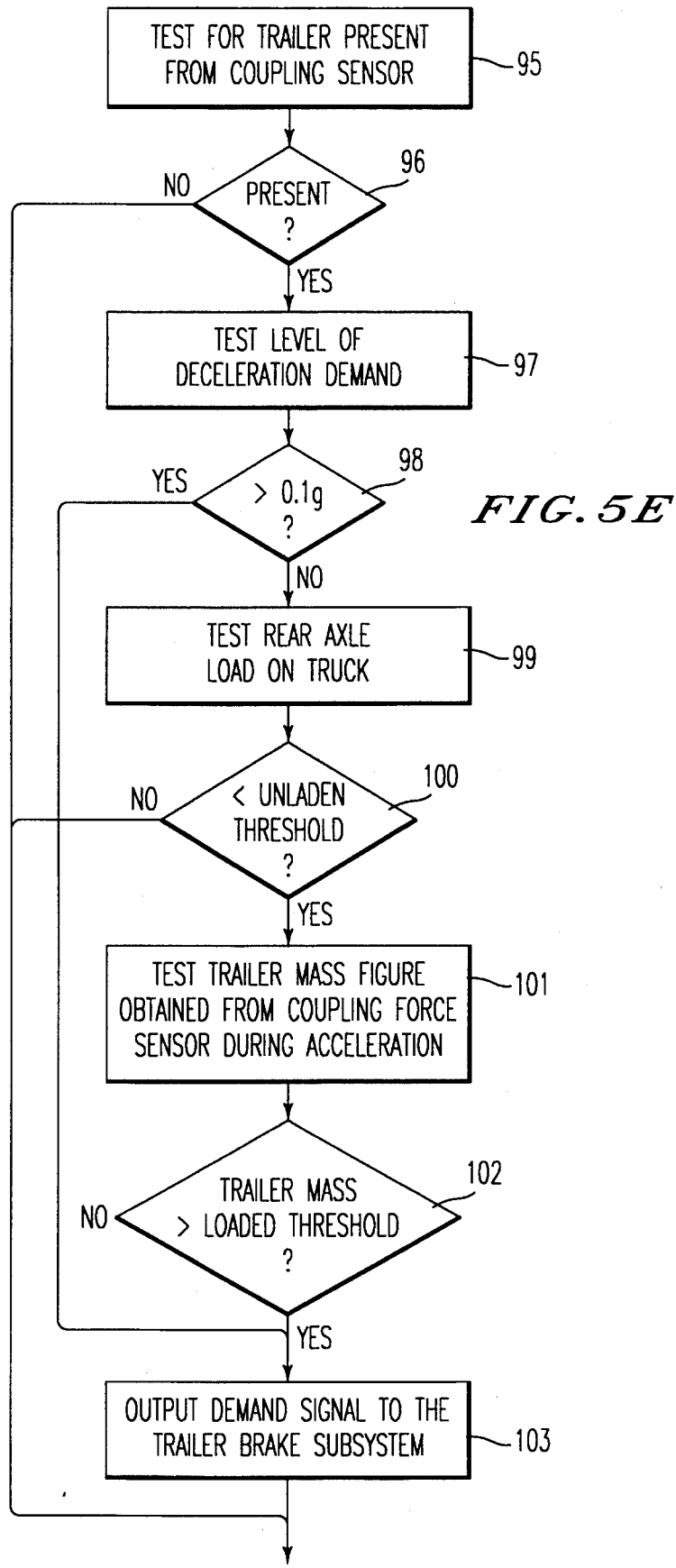

Referring now to the Flow Chart of FIGS. 5a and 5b, when the pedal is off-zero the output is converted into a deceleration demand and the first test to be made is whether any skidding is taking place. If there is, the retarder will be disabled and all the pedal demand will be used to cause foundation braking pressures of both axles.

Axle pressures depend on axle loads, so these are measured by the load sensors 20,22 and added to form also the total vehicle weight. From the weight figure and knowing the retarder capability the pedal braking demand is tested to find whether this can be met by the retarder alone. If this is so, the demand is multiplied by the total vehicle weight and, knowing the Retarder Braking Force constant KR, the retarder demand is calculated and output to the retarder system. Front and rear braking pressures are set to zero since no foundation braking is required unless the Retarder Torque has fallen because of low speed operation, which will be addressed later by low speed operation of foundation braking at the rear axle. If the demand is greater than the normal retarder capability, the retarder receives a maximum drive signal and the excess demand over the retarder capability is calculated. It should be noted that, if skidding is taking place, all the demand is effectively excess demand. Now a number of calculations are made as follows.

1. The excess demand may have to be met at the front axle so a front axle pressure to meet this is calculated using the total vehicle weight and front axle brake constant.

2. From a measure of nominal retarder torque and equivalent rear axle braking constant, notional braking pressure is calculated which would have the same braking effect.

3. This rear pressure is reflected into the front axle in order to establish a limit on front-axle-only pressure so that the braking effort would be the same as that developed by the retarder but modified by the ratio of axle weights. i.e.

$$\text{Max front only pressure } PBfm = \frac{KR \cdot TR \cdot Wf}{KBf \cdot Wr}$$

4. If the front axle pressure required to meet this excess demand is greater than PBfm, then braking will be instituted using both axle foundation brakes. If not, then the calculated front axle pressure can be formed ready for output and the rear pressure will be zero unless falling retarder torque requires some infill.

5. If braking at both axles is required then it will be biased towards the front axle to counter the retarder contribution at the rear, by the value of PBfm.

PBfm is therefore set aside by subtracting this from the calculated figure of front axle pressure to meet the whole excess demand and it is this pressure difference which must be allocated between axles based upon relative loadings. Therefore PFront−PBfm is converted back to a demand component.

6. The demand component is provided by calculating an additional front pressure and an accompanying rear pressure from the demand passed upon the axle loads, giving two pressure components PBfe and PBre.

7. Front pressure is formed from PBfe+ PBfm but this might, at very high demands, be greater than maximum front pressure PFmax so that front pressure is formed as Pfmax and pressure shortfall PBfm+ PBfe− PFmax=Pro is calculated.

8. Pressure shortfall Pfo must be made up at the rear axle so an equivalent rear pressure is calculated from relative brake factors Kf & Kr. This pressure is PBe and is added to PBre in order to form the rear brake pressure. 9. The rear brake pressure now may require an increase to make up for falling retarder efficiency and this is detected by measuring or calculating the retarder torque and the retarder 'torque at maximum' signal. The torque deficiency is calculated and an equivalent rear brake pressure is calculated to supplement the retarder. 10. This is added to the established rear pressure and if this exceeds maximum, then pressure is limited to this maximum.

Output pressures are established as finally calculated.

The boxes indicated in FIGS. 5a, 5b and 6 are identified as follows:

60: Brake pressure and retarder setting

62: Read pedal absolute and subtract zero cal.

63: Demand zero

64: Scale pedal into deceleration demand, measure and store vehicle axle loads and determine vehicle total weight 65: Test for any wheel skidding 66: Skidding ?

67: From weight total calculate max retarder deceleration, test demand against retarder max capability 68: Demand greater retarder max output 69: Output max signal to retarder, subtract retarder contribution from demand to generate excess demand $D_E$ 70: Calculate front pressure to meet $D_E$ based on total vehicle weight. Calculate equivalent rear braking pressure to retarder output torque. Refer this figure to front axle using axle weight ratio to give $$P_{BfM} = \frac{K_R \cdot T_R \cdot W_f}{K_{Bf} \cdot W_r}$$

71: Test front pressure to meet $D_E$ against $P_{Bfm}$

72: >$P_{Bfm}$

73: Subtract $P_{Bfm}$ from calculated front pressure and calculate the demand equivalent to this difference 74: From this demand, assign additional distributed front and rear pressures $P_{Bfe}$ and $P_{Bre}$ to meet it 75: Calculate $P_{Bfe}$ and $P_{Bre}$ as total front pressure, Test if this exceeds the maximum front pressure 76: >$P_{f\,max}$ 77: Form front pressure=$P_{fmax}$ Calculate $P_{Bfm}$+$P_{Bfe}$−$P_{F\,max}$=$P_{Fo}$ 78: From $P_{Fo}$ calculate equivalent brake pressure $P_{B\,req}$ to meet this demand 79: ADD $P_{Bre}$+$P_B$ req to form Rear Pressure 80: Form $P_{Bfm}$ +$P_{Bfe}$ as Front Pressure Form $P_{Bre}$ as Rear Pressure 81: Form front pressure to meet $D_E$ Form Rear pressure=0

82: Output retarder demand to retarder system Form front and rear pressures at 0

83: From pedal demand X total vehicle weight, calculate the retarder demand from retarder torque const.

84: Set retarder demand to zero Form axle pressures from full pedal demand and axle load measurements 85: Form pressures as zero; set retarder to zero 86: Read retarder torque figure and max torque feedback signal 87: Test if max torque signal is set

88: SET?

89: Calculate torque deficiency from required torque-measured torque Convert torque deficiency into equivalent rear brake pressure; add this equivalent rear pressure to formed rear pressure Test total for exceeding max rear pressure 90: $>P_{R\ max}$ 91: Set rear pressure to $P_{R\ max}$ 92: Use total to form rear pressure 93: Output front and rear pressures 94: End of routine 95: Test for trailer present from coupling sensor 96: Present ?

97: Test level of deceleration demand

98: $>0.1g$

99: Test rear axle load on truck

100: <Unladen threshold

101: Test trailer mass figure obtained from coupling force sensor during acceleration 102: Trailer mass>loaded threshold 103: Output demand signal to the trailer brake subsystem.

With an integrated braking system where a trailer is being towed (as in the example of FIG. 1), improvement in safety during braking can be achieved by automatically signalling a trailer braking demand from the pedal demand from the pedal demand signal direct so that retarder operation is accompanied by corresponding foundation braking at the trailer. Optionally, this pedal demand signal is offset slightly by subtracting a small constant therefrom in order to generate small retarder demands at the towing vehicle alone so that check braking can be achieved by use of the retarder but at any higher demand brake both vehicles together. This option would be preferable with a semi-trailer where some of the trailer load is carried on the towing vehicle.

An EBS system can recognize truck and trailer loading so that, where an unladen truck is towing a laden trailer, (a dangerous combination during braking), the retarder-only braking is not permitted and braking always includes the truck front axle and trailer axles in addition to any retarder.

In conclusion, proper coordination of the two braking systems from a single pedal input requires a retarder capable of variable operation, either continuously so or arranged in a series of small steps but, when compared with either system operated alone, can generate very significant advantages which ease the task of the vehicle driver.

I claim:

1. An electronic braking system for a vehicle having at least front and rear axles and having foundation brakes and a vehicle retarder which includes a variable retarder braking torque separate from said foundation brakes, wherein an electrical braking demand signal is generated from a single brake pedal and wherein said retarder is operably adjusted as displacement of said pedal is increased from zero up to a partial point in a range of movement of the pedal which is calculated to give a substantially maximum retarder power based upon total mass of the vehicle, such that for a fully laden condition of said vehicle said partial point occurs at low pedal deflection and, in an unladen condition of said vehicle, said point occurs at a higher pedal deflection, and in both the fully laden and unladen conditions, pushing of said pedal beyond said calculated partial point causes foundation braking to be commenced to supplement said retarder torque.

2. An integrated braking system as in claim 1, in which said foundation braking is introduced at said front axle only and is increased with increasing pedal travel up to a point where the front axle braking effort is equal to a braking effort achieved by said retarder at said rear axle with correction being made dependent upon distribution of load between said front and rear axles, so that equal road adhesion between the axles is obtained.

3. A system as in claim 1, in which the retarder torque alone provides for low level braking and is supplemented by single axle foundation braking to an increasing level as speed decreases when retarder output decreases, in order to maintain vehicle deceleration from a constant brake pedal input.

4. A system as in claim 3, which comprises a retarder controller increasing retarder drive to maintain a constant developed retarder torque until said retarder reaches maximum drive so that a further decrease in retarder effectiveness is accompanied by an increasing application of said foundation brakes to maintain a combined effective braking force obtained from said foundation brakes and said retarder down to a substantially zero velocity of the vehicle.

5. A system as in claim 1, wherein upon first detection of a skid condition at one of said front and rear axles, said retarder is switched off and an equivalent level of braking is applied to all vehicle axles as a friction braking substitute component without any change in brake pedal position, whereas if foundation braking was taking place when skidding was detected, the substitute component is added to existing braking pressures.

6. A braking system as in claim 1, wherein the vehicle comprises a truck towing a trailer and wherein at all braking demand levels in excess of a region where the driver is demanding only check braking, trailer braking is instituted whenever the retarder is substantially deployed.

7. A braking system as in claim 1, wherein the vehicle comprises an unladen truck towing a laden trailer and includes a system controller which recognizes the laden trailer's condition and includes means for discontinuing braking by said retarder along in favor of foundation braking at all axles and at the trailer in unison, with retarder braking effort being retained at one of said front and rear axles wherein said one of said front and rear axles comprises a drive axle.

* * * * *